United States Patent
Meng et al.

(10) Patent No.: US 7,937,060 B2
(45) Date of Patent: May 3, 2011

(54) SELF-IMPROVING CHANNEL-ACCESS PROTOCOL FOR AD-HOC NETWORKS

(75) Inventors: Xiaoqiao Meng, Los Angeles, CA (US); J. J. Garcia Luna Aceves, San Mateo, CA (US)

(73) Assignee: Palo Alto Research Alto Incorporated, Palo Alto, CA (US)

( * ) Notice: Subject to any disclaimer, the term of this patent is extended or adjusted under 35 U.S.C. 154(b) by 370 days.

(21) Appl. No.: 11/544,059

(22) Filed: Oct. 6, 2006

(65) Prior Publication Data

US 2008/0095102 A1    Apr. 24, 2008

(51) Int. Cl.
*H04Q 7/00* (2006.01)
(52) U.S. Cl. .............. 455/329; 455/422.1; 455/450
(58) Field of Classification Search ............ 370/328, 370/329; 455/464.1
See application file for complete search history.

(56) References Cited

U.S. PATENT DOCUMENTS

| | | | |
|---|---|---|---|
| 4,677,617 A * | 6/1987 | O'Connor et al. ............ 370/478 |
| 4,811,420 A * | 3/1989 | Avis et al. .................... 455/502 |
| 6,747,961 B1 * | 6/2004 | Ahmed et al. ................ 370/328 |
| 6,788,702 B1 | 9/2004 | Garcia-Luna-Aceves .... 370/458 |
| 6,791,997 B2 | 9/2004 | Beyer ........................... 370/328 |
| 6,947,398 B1 * | 9/2005 | Ahmed et al. ................ 370/331 |
| 7,046,639 B2 | 5/2006 | Garcia-Luna-Aceves .... 370/314 |
| 2002/0067736 A1 * | 6/2002 | Garcia-Luna-Aceves et al. ............................. 370/442 |
| 2002/0154610 A1 * | 10/2002 | Tiedemann et al. .......... 370/329 |
| 2003/0012176 A1 * | 1/2003 | Kondylis et al. ............... 370/348 |
| 2004/0110508 A1 * | 6/2004 | Haartsen ....................... 455/445 |
| 2005/0220131 A1 * | 10/2005 | Ginzburg et al. ............. 370/432 |
| 2005/0243794 A1 | 11/2005 | Yoon |
| 2006/0198353 A1 | 9/2006 | Wason |
| 2007/0060160 A1 * | 3/2007 | Hur et al. ...................... 455/450 |

OTHER PUBLICATIONS

Bao, Lichun et al., "Distributed dynamic channel access scheduling for ad hoe networks", www.sciencedirect.com, Journal of Parallel and Distributed Computing, Oct. 17, 2002.

* cited by examiner

*Primary Examiner* — Nghi H Ly
*Assistant Examiner* — Joseph Dean, Jr.
(74) *Attorney, Agent, or Firm* — Park, Vaughan, Fleming & Dowler LLP; Shun Yao (57) ABSTRACT

A communication system includes devices configured to communicate with each other through a temporal sequence of frames. Each of these frames includes multiple sub-channels and network information. Note that the network information in a given frame transmitted from a first device includes identification information for a second device that is communicating with the first device and corresponding sub-channels used by the first device and the second device to transmit data. Furthermore, the first device and the second device are configured to dynamically reserve one or more sub-channels based on the network information when communicating with each other, and dynamic-reservation conflicts may occur in which the first device and the second device both reserve a common sub-channel.

16 Claims, 8 Drawing Sheets

SELF-IMPROVING CHANNEL-ACCESS PROTOCOL FOR AD-HOC NETWORKS

BACKGROUND

1. Field of the Invention

The present invention relates to techniques for accessing channels in networks. More specifically, the present invention relates to dynamic channel-access protocols.

2. Related Art

Recent advances in networking technology have made it possible to support multiple voice-related applications, such as mobile smart phones and Voice over Wireless Internet Protocol (VoWIP) on individual networks. In the near future, these applications may be running on mobile stations concurrently with legacy data-centric applications. To support such integrated voice/data traffic in a network, the channel-access protocol in these systems needs to provide high channel utilization and bounded channel-access delay. The former is important for data-centric applications, and the latter is critical for providing uninterrupted data delivery in voice-related applications.

Contention-based channel-access schemes have previously been developed for ad-hoc networks and for wireless local area networks or LANs. However, these existing approaches are unable to provide high channel utilization as network load increases. In addition, ad-hoc networks that utilize such conventional channel-access schemes are vulnerable to collisions, which can potentially starve certain stations. As a consequence, the existing contention-based approaches are unable to ensure an upper bound on the channel-access delay.

'Contention-free' schemes have been proposed to overcome these limitations. These contention-free schemes use global and/or local topology information to produce deterministic transmission schedules that allow nodes in an ad-hoc network to periodically access the communication channel without collision and to also ensure a bounded channel-access delay. Unfortunately, these contention-free schemes typically require an excessive amount of control signaling overhead and may not be tolerant of topological changes.

Recently, randomized channel-access approaches have been proposed in an attempt address these additional challenges. These randomized schemes utilize probabilistic transmission schedules in which each device always has a certain probability to access the channel during a given data slot. While such approaches incur less control overhead than the earlier contention-free channel-access protocols, they still do not ensure a bound on channel-access delay.

Hence what is needed is a method and an apparatus that facilitates channel-access in networks without the problems listed above.

SUMMARY

One embodiment of this invention provides a communication system that includes devices configured to communicate with each other through a temporal sequence of frames. Each of these frames includes multiple sub-channels and network information. Note that the network information in a given frame transmitted from a first device includes identification information for a second device that is communicating with the first device along with corresponding sub-channels used by the first device and the second device. Furthermore, the first device and the second device are configured to dynamically reserve one or more sub-channels based on the network information when communicating with each other, and dynamic-reservations conflicts may occur in which the first device and the second device both reserve a common sub-channel.

In some embodiments, the network information is included in a first portion of the given frame and the sub-channels are included in a second portion of the given frame. In addition, the network information may further specify a time when the first device received a frame from the second device.

In some embodiments, the sub-channels correspond to time slots in the given frame, frequency bands in the given frame, spread-spectrum codes in the given frame, and/or intervals that are associated with directional antennas that transmit and receive the frames. Furthermore, the sub-channels may be reserved for one frame, or for two or more frames.

In some embodiments, the sub-channels are dynamically reserved based on usage probabilities that are determined from network information in multiple frames.

In some embodiments, a third device that is communicating with the first device and the second device arbitrates reservation conflicts in which the first device and the second device each attempt to reserve a given sub-channel. For example, such a reservation conflict may be resolved based on a ranking of the first device and the second device, where the ranking is based on a unique value for each device for the given sub-channel. These unique values for the devices may be based on a hash function or a pseudo-random sequence. Furthermore, the third device may resolve the reservation conflict by providing feedback to the first device and the second device.

In some embodiments, communication between the devices is synchronized based on a clock signal. This clock signal may include a global positioning system signal. Alternatively, in some embodiments communication between the devices is self-synchronized.

Another embodiment provides a method including operations corresponding to the functions in the above-described communication system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and devices for use with the communication system are described. Communication between the devices in the communication system may be enabled by the method. In particular, a multiple-access protocol (sometimes referred to as Opportunistic Reservation Multiple Access or ORMA) may be employed to obtain both a high channel utilization and a bounded channel-access delay when scheduling access by different devices or nodes to a shared communication channel in a network (such as an ad-hoc or random network). In this approach, devices communicate by exchanging a temporal sequence of frames, which may include a random-access section and a scheduled-access section. This random-access section may be used to exchange neighborhood or network information (including a list of one or more additional devices that are communicating with a given device), and the scheduled-access section may be used for data transmissions. Furthermore, the scheduled-access section may be further divided into sub-channels, such as time slots, frequency bands, spread-spectrum codes, and/or intervals associated with directional antennas that transmit and receive the frames.

In order to obtain high throughput, devices in the communication system may dynamically access each of these sub-channels through reservations or elections that are based on usage probabilities determined from network information in one or more frames. Conflicts that occur when multiple devices attempt to reserve a common sub-channel may be mediated by another device that is communicating with the multiple devices. In particular, the other device may determine a ranking of at least the two devices for the common sub-channel based on a contention-resolution procedure to identify a winner of the conflict. In this way, the channel-access delay is bounded while the devices incrementally firm up the randomized transmission schedules to form deterministic ones. Furthermore, the flexibility of this multiple-access protocol enables the communication system to handle topology changes caused by the addition or deletion of a device from the network, as well as a device moving within the network.

The method, devices, and/or communication system associated with the present invention may be utilized in a wide variety of network applications, including LANs (such as WiFi, WiMax, and/or a LAN that utilizes a communication protocol that is compatible with an IEEE 802 standard), wide area networks or WANs, metropolitan area networks or MANs, and/or cellular telephone networks (such as the Global System for Mobile communication or GSM). In addition, the method and/or communication system may include fixed and/or mobile stations, devices or nodes (henceforth referred to as devices), and the network may utilize fixed cells and/or may be an ad-hoc network. In an exemplary embodiment, the network is a mobile ad-hoc network. And in some embodiments, the method, devices, and/or communication system may involve or include communication protocols such as time division multiple access or TDMA, frequency division multiple access or FDMA, code division multiple access or CDMA, and/or a spatial diversity technique.

We now discuss existing channel-access protocols, which may be categorized as contention-free and contention-based. Contention-free schemes typically require time synchronization which involves scheduling collision-free transmissions over time slots. Note that depending on how the sub-channels (such as time slots) are assigned to devices, these approaches may be further categorized as deterministic and randomized.

Figure 1:
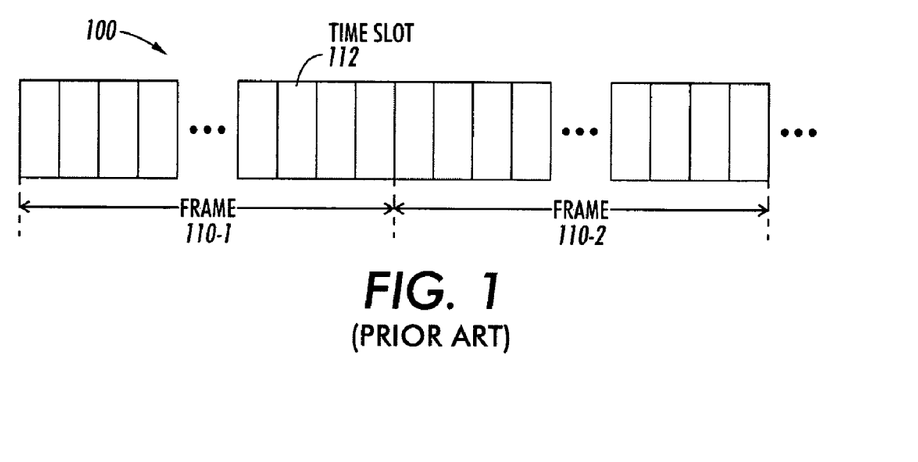
FIG. 1 is a block diagram illustrating an existing channel-access protocol.

An example of a deterministic, contention-free protocol is shown in FIG. 1, which provides a block diagram illustrating an existing channel-access protocol 100. In this protocol, time is divided into frames 110, each of which includes multiple time slots (such as time slot 112). Furthermore, in each frame, a few time slots are assigned to a given device. Such assignments are deterministically fixed for every frame. While this approach bounds the worst-case channel access delay, the bound is in proportion to the entire population of the network (i.e., the number of devices), which can be very large. In addition, these approaches may require devices to exchange control messages in every time slot and, as the population of the network increases, may offer less efficient channel utilization.

Figure 2A:
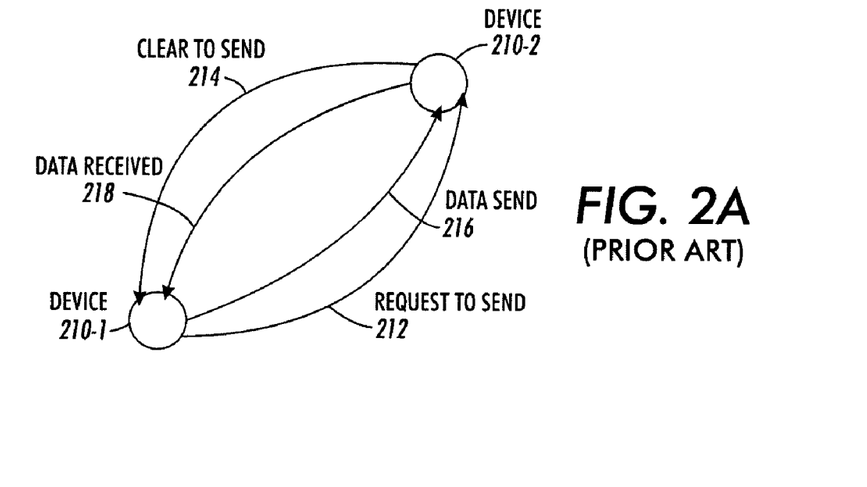
FIG. 2A is a block diagram illustrating an existing channel-access protocol.
Figure 2B:
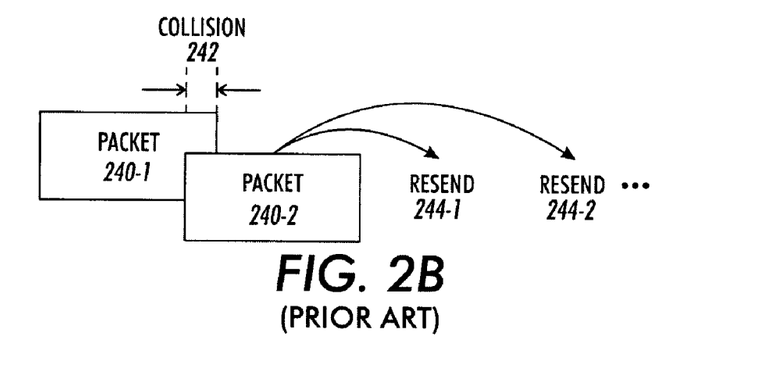
FIG. 2B is a block diagram illustrating a collision in an existing channel-access protocol.

Contention-based protocols may be categorized as pure random access and those with reservation/collision-resolution. Random-access schemes are typically more suitable for light traffic load because their channel-utilization ratio is low. Moreover, these approaches may not be able to provide a bounded channel-access delay. These characteristics of random-access, collision-based schemes are shown in FIGS. 2A and 2B, which provide block diagrams illustrating an existing channel-access protocol 200 and a collision 242 in the existing channel-access protocol 200. In channel-access protocol 200, communication between devices 210 is mediated via handshaking signals, including request to send 212, clear to send 214, data send 216, and data receive 218. However, these handshaking signals involve considerable overhead and hence are time consuming and inefficient. In addition, due to the random nature of the protocol 200, collisions, such as the collision 242, between data packets 240 may occur. In the event of such a collision, data packet 240-2 is resent 244-1. Unfortunately, as channel utilization increases, additional collisions may occur and the data packet 240-2 may be resent 244-2 even later. Thus, the channel-access delay is potentially unbounded.

Figure 3:
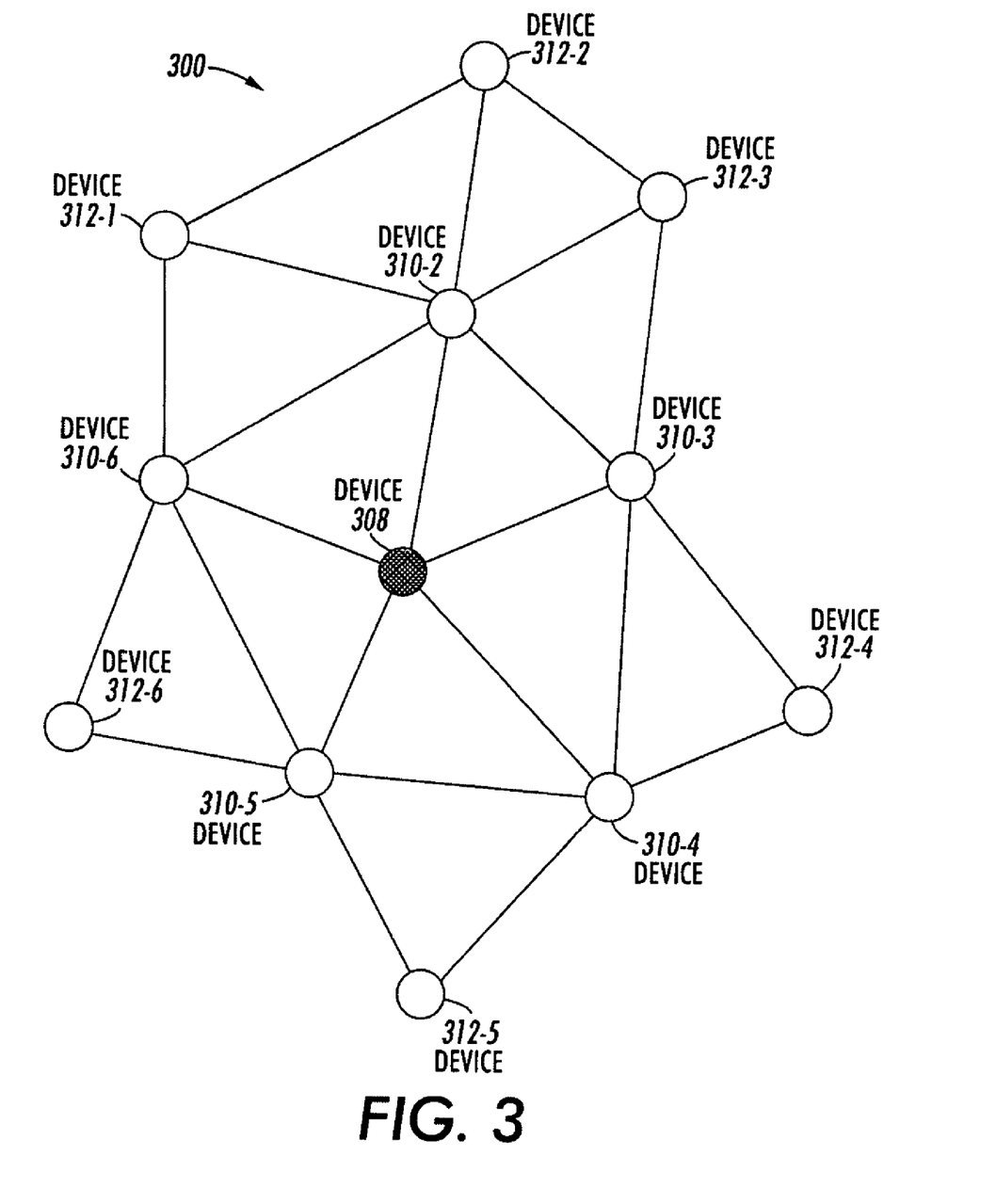
FIG. 3 is a block diagram illustrating an ad-hoc network in accordance with an embodiment of the present invention.

As we now discuss, the present invention provides a channel-access protocol that utilizes a probabilistic, topology-based scheduling approach. For example, FIG. 3 provides a block diagram illustrating an ad-hoc network 300 in accordance with an embodiment of the present invention. In ad-hoc network 300, device 308 communicates with nearest neighbor devices 310 (which are sometimes referred to as 'one-hop' neighbors of device 308), which in turn communicate with second-nearest neighbor devices 312 (which are similarly referred to as 'two-hop' neighbors of device 308).

During communication, the devices 308, 310 and 312 exchange a temporal sequence of frames. (Note that these frames are discussed further below with reference to FIGS. 5A and 5B.) When communication between devices 308 and 310 occurs for the first time, device 308 and devices 310 may each reserve or elect one or more sub-channels in a frame during a random-access section in at least one of the frames. Each of the devices 308 and 310 has a certain probability to pick up a given sub-channel (such as a time slot) to broadcast its own identity or any one-hop neighborhood information it has. In this way, the devices 308 and 310 may incrementally build up their neighborhood information. However, note that the devices 308 and 310 may need to retransmit packets multiple times during this process, and during the scheduled-access procedure described below in order to ensure that these packets are received. Furthermore, also note that this random-access section or interval may repeat periodically to accommodate changes in the ad-hoc network 300, such as when one or more of the devices 308, 310, and 312 is added, removed, and/or relocated.

Conflicts that occur (such as when devices 308 and 310-2 each attempt to reserve a common sub-channel) may be mediated by another device, such as device 310-6, that communicates with devices 308 and 310-2. In particular, the device 310-6 may determine a ranking of the devices 308 and 310-2 for the common sub-channel and provide feedback to the devices 308 and 310-2 that identifies a winner of the conflict (i.e., the device that obtains the reservation). The winning device may then retransmit the affected packet. Note that the ranking may be determined based on a unique value for the common sub-channel for each of the devices 308 and 310-2. As discussed further below with reference to FIG. 7, these unique values for the devices 308 and 310-2 may be based on one or more hash functions or one and/or more pseudo-random sequences.

Once communication has been established, the devices 308 and 310 may dynamically reserve sub-channels during a scheduled-access section or interval in the temporal sequence of frames. These dynamic reservations may be based on usage probabilities (i.e., which of the devices 308 and 310 have been and/or are using which sub-channels) that are determined from the network information that is included in one or more frames (including information on the two-hop nearest neighbors or the two-hop topology). Note that the reservations for a given sub-channel may be for one frame, or for two or more frames.

Conflicts may also occur during the scheduled-access section or interval. In particular, conflicts may occur if there are changes to the two-hop neighborhood around the device 308 prior to the next random-access section or interval. Such conflicts may be resolved by another device, such as the device 310-6, using the procedure described above. Note that in some embodiments there may be multiple frames with scheduled-access for each random-access frame.

In some embodiments, communication between the devices 308, 310, and 312 in the ad-hoc network 300 is synchronized based on a clock signal. This clock signal may include a global-positioning-system (GPS) signal. Alternatively, in some embodiments communication between the devices 308, 310, and 312 is self-synchronized. Note that synchronization in the ad-hoc network 300 may be local and/or global. In addition, synchronization may be within a frame, for example, using preamble information that may be included in one or more of the sub-channels.

Thus, the ad-hoc network 300 may utilize distributed intelligence in the devices 308, 310, and 312 to enable dynamic scheduling (via distributed election or reservation of sub-channels) and resolution of any conflicts that occur due to incomplete topology information that is available to any of the devices 308, 310, and 312. As discussed further below, this approach may combine flexibility, a bounded channel-access delay for any of the devices 308, 310, and 312, a large value of throughput, and/or a large value of the channel utilization. Note that in some embodiments ad-hoc network 300 includes fewer or additional components, two or more components are combined into a single component, and/or a position of one or more components may be changed.

Figure 4:
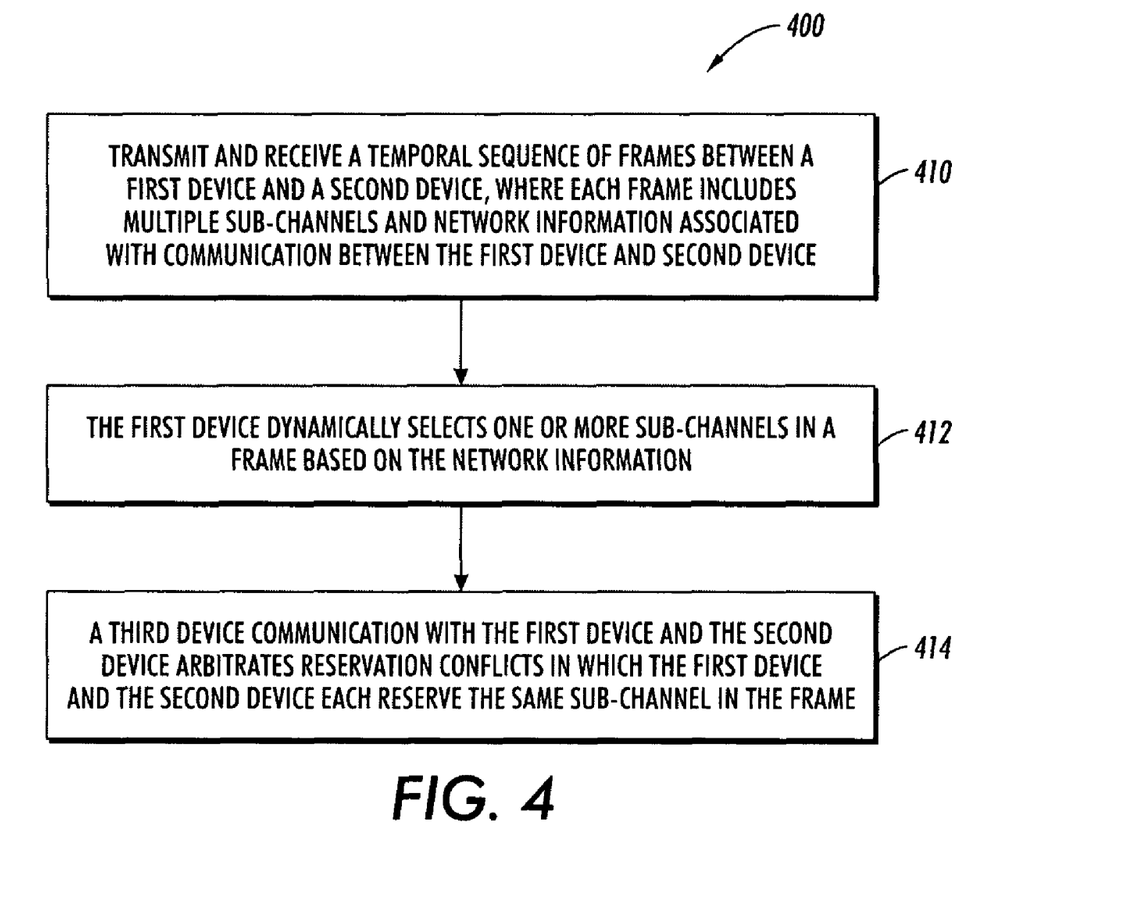
FIG. 4 is a flow chart illustrating communicating between devices in accordance with an embodiment of the present invention.

We now describe embodiments of a process for communicating between devices. FIG. 4 provides a flow chart illustrating a process 400 for communicating between devices in accordance with an embodiment of the present invention. During this process, a first device and a second device may transmit and receive a temporal sequence of frames (410). Each of these frames includes multiple sub-channels and network information (such as device identification information and reserved sub-channels) associated with communication between the first device and the second device. Next, the first device may dynamically select one or more sub-channels in a frame based on the network information (412). Then, a third device communicating with the first device and the second device may arbitrate reservation conflicts in which the first device and the second device each reserve the same sub-channel in the frame (414). Note that in some embodiments there may be additional or fewer operations, the order of the operations may be changed, and two or more operations may be combined into a single operation.

Figure 5A:
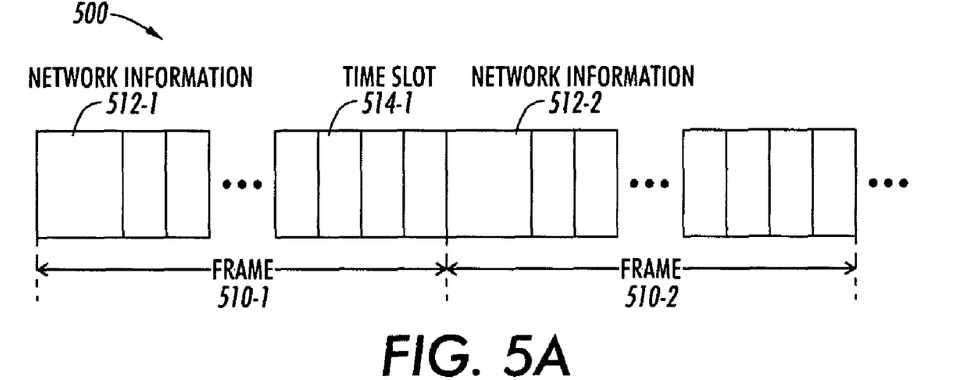
FIG. 5A is a block diagram illustrating a sequence of frames in accordance with an embodiment of the present invention.

We now discuss embodiments of frames that are communicated between the devices. FIG. 5A provides a block diagram illustrating a sequence of frames 510 in accordance with an embodiment 500 of the present invention. These frames may be exchanged during the scheduled-access section or interval. Each of the frames, such as frame 510-1, may include a first portion that includes network information 512-1 and a second portion that includes multiple sub-channels, such as time slots 514. Note that the network information 512-1 may identify devices that are communicating with a given device and corresponding sub-channels used by the given device and the other devices in a frame (i.e., two-hop neighborhood information in the ad-hoc network).

Figure 5B:
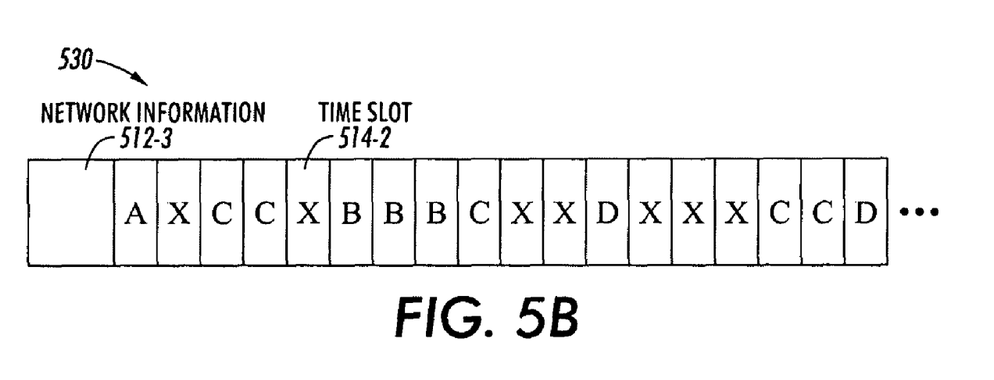
FIG. 5B is a block diagram illustrating a frame in accordance with an embodiment of the present invention.

As discussed above, the devices in an ad-hoc network may dynamically reserve one or more of the sub-channels in a given frame. This is shown in FIG. 5B, which provides a block diagram illustrating a frame 530 in accordance with an embodiment of the present invention. In the frame 530, reserved sub-channels are identified with the letters A, B, C, or D corresponding to devices in the two-hop neighborhood and available sub-channels are identified by the letter X. When communicating the frame 530, a given device transmits data packets (i.e., is in a transmit mode of operation) during any sub-channels it has reserved and receives data packets (i.e., is in a receive mode of operation) during other sub-channels. Furthermore, Request-to-Reserve (RTR) information and/or Report-Reservation-Collision (RRC) information may be included in each of the sub-channels by one or more devices, for example, in K mini-slots that are used by the devices in a one-hop neighborhood. Note that K is a system-wide parameter that may be larger than the maximum number of devices in any one-hop neighborhood in the ad-hoc network.

In general, a length of each of the frames 510 may be long enough to accommodate a number of sub-channels that is sufficient for the communication needs of the maximum number of devices that are expected within a two-hop neighborhood for the given device. In an exemplary embodiment where the sub-channels are time slots, there are 100 time slots per frame and the length of each of the frames 510 is at least 0.5 ms. In another exemplary embodiment where the sub-channels are time slots, there are K devices in a one-hop neighborhood and K+1 data time slots per frame.

In some embodiments, the sub-channels in the frames 510 correspond to time slots in the given frame, frequency bands in the given frame, spread-spectrum codes in the given frame, and/or intervals associated with directional antennas that transmit and receive the frames. In addition, in some embodiments the network information 512 may further include a time when the given device received a frame from another device. This additional information may be used to determine and/or correct for multi-path signals in a network. Note that in some embodiments the frames 510 and/or 530 include fewer or additional components, two or more components are combined into a single component, and/or a position of one or more components may be changed.

Figure 6:
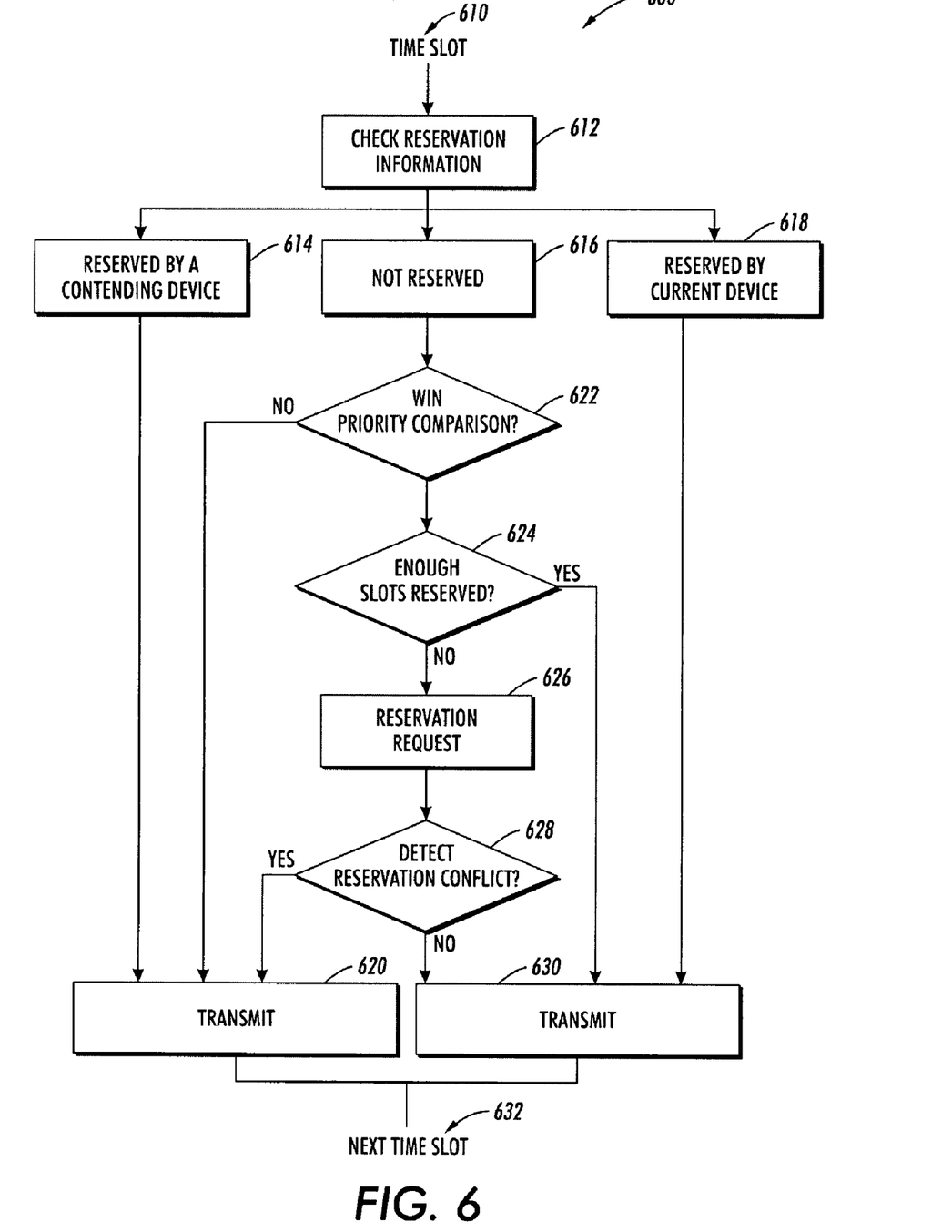
FIG. 6 is a flow chart illustrating the process of reserving of sub-channels in accordance with an embodiment of the present invention.

We now discuss embodiments of a process for dynamically reserving sub-channels. FIG. 6 provides a flow chart illustrating a process 600 for reserving sub-channels in accordance with an embodiment of the present invention. During this process, a given device, such as the device 308 (FIG. 3), considers transmitting a data packet using a sub-channel, such as time slot 610, in a given frame. First, the device 308 (FIG. 3) checks stored reservation information (612), which records the reservation status of every sub-channel in the frame. If the time slot 610 is already reserved by another device (614), device 308 (FIG. 3) is silent (620), i.e., a reservation for this time slot is not made and a data packet is not transmitted using this sub-channel. Instead, device 308 (FIG. 3) may remain in a receive mode of operation. Alternatively, if the time slot is already reserved by device 308 in FIG. 3 (618), device 308 (FIG. 3) transmits (630) the data packet using this sub-channel.

When the time slot is not reserved (616), device 308 (FIG. 3) determines whether or not it wins a priority comparison (622) for time slot 610. For example, device 308 (FIG. 3) may determine a ranking for time slot 610 based on unique values for the device 308 in FIG. 3 and other devices that device 308 (FIG. 3) knows it is communicating with (i.e., the two-hop neighborhood information that is provided by the network information 512 in FIGS. 5A and 5B). For example, for a time slot t a given device (with identification i) may assign itself a priority $$P = \text{hash}(i \oplus t),$$

where $\oplus$ represents a concatenation operation and hash is a hash function that maps an input to a pseudo-random real value between 0 and 1. In some embodiments, the priority P is concatenated again with the device identification i to ensure that the output is unique. Note that since device 308 (FIG. 3) knows the N devices in its two-hop neighborhood (barring a change in the topography), it may also infer the priority for these N devices. Also note that the probability of the given device winning the priority comparison is $$\frac{1}{N+1}.$$

If device 308 (FIG. 3) losses the priority comparison, it is silent (620). Alternatively, if device 308 (FIG. 3) wins the priority comparison, the device 308 (FIG. 3) determines if it has previously reserved enough sub-channels (624) to determine if another sub-channel is needed. For example, the device 308 (FIG. 3) may have a sufficient number of reservations if it has reserved $$\frac{T}{N+1} \tag{1}$$

out of the T sub-channels in a frame, where N is the number of devices in the two-hop neighborhood. (Note that if Eqn. 1 is a floating-point value, it may be rounded to its closest integer lower bound.) However, in other embodiments the given frame is divided into sub-regions or intervals, and device 308 (FIG. 3) may be required to reserve at least one time-slot in each sub-region or sub-interval. Furthermore, if enough sub-channels have been previously reserved, device 308 (FIG. 3) transmits (630) without reserving time slot 610, and if not, device 308 (FIG. 3) requests a reservation (626) for this time slot. For example, to request a reservation device 308 (FIG. 3) may send an RTR, including the device identification i, in the first mini-slot in a time slot in the given frame. Device 308 (FIG. 3) may then switch to a receive mode of operation for the following K mini-slots.

Next, device 308 (FIG. 3) determines if there is a reservation conflict (628) based on feedback from other device that it is communicating with. For example, if device 308 (FIG. 3) does not receive an RRC in any of the K mini-slots, the reservation is successful. If there is a conflict (for example, due to a change in the network topology), device 308 (FIG. 3) is silent (620) (pending a resolution of the conflict as described previously and below with reference to FIG. 7). And if there is not a conflict, device 308 (FIG. 3) transmits (630). Note that in some embodiments device 308 (FIG. 3) continues to send the RTR in any of its reserved sub-channels even after the reservation is successful. This approach may reduce the probability that a neighboring device does not receive the request from the device 308 (FIG. 3) due to the loss of a single RTR message.

Finally, the process 600 may be repeated for a next sub-channel, such as time slot 632, in the given frame. Note that in some embodiments there may be additional or fewer operations, the order of the operations may be changed, and two or more operations may be combined into a single operation.

While device 308 (FIG. 3) is making and firming up a reservation for one or more sub-channels, other devices that it is communicating with may play a role in confirming reservations and resolving eventual conflicts. For example, if device J receives a RTR for a sub-channel from device K, it determines whether or not device K has previously reserved this sub-channel. If yes, device J remains in a receive mode of operation and waits for data to be transmitted from device K. Otherwise, the received RTR indicates a reservation attempt, and device J switches to the receive mode of operation for this sub-channel.

If device J correctly receives data packets from device K using the requested sub-channel, device J knows that the reservation attempt by device K succeeded. Then, device J updates its reservation table to record this new reservation. And when device J subsequently transmits in any future sub-channel or frame, it may notify its one-hop neighbors about the reservation by device K. In this way, eventually all of the devices in the two-hop neighborhood of device K are alerted to the new reservation made by device K.

As discussed previously, devices in a network may utilize one or more rankings to determine which device has priority when reserving a sub-channel in a frame. In particular, to avoid conflicts the device that is making the reservation may determine such a ranking prior to attempting to reserve the sub-channel. However, since this device has limited topography information, conflicts may still occur. Such conflicts may occur for a variety of reasons, including untimely propagation of new reservation announcements and topological changes since a last random-access interval (i.e., the collected two-hop neighborhood information is no longer valid due to addition, deletion, or motion of one or more devices in the network).

When a conflict occurs, a device L that is communicating with the devices that are in conflict may receive RTRs for the same sub-channel from these devices (recall that in some embodiments RTRs are always provided for every reserved sub-channel). Alternatively, the device L may receive an RTR for a sub-channel from a first device but not from a second device. However, if the second device has reserved this sub-channel (as indicated in the current reservation table in the device L), the device L is aware that a conflict has occurred. In this case, the device L may resolve the conflict by determining one or more device rankings for the sub-channel(s) in question and providing feedback to the devices that are in conflict.

Figure 7:
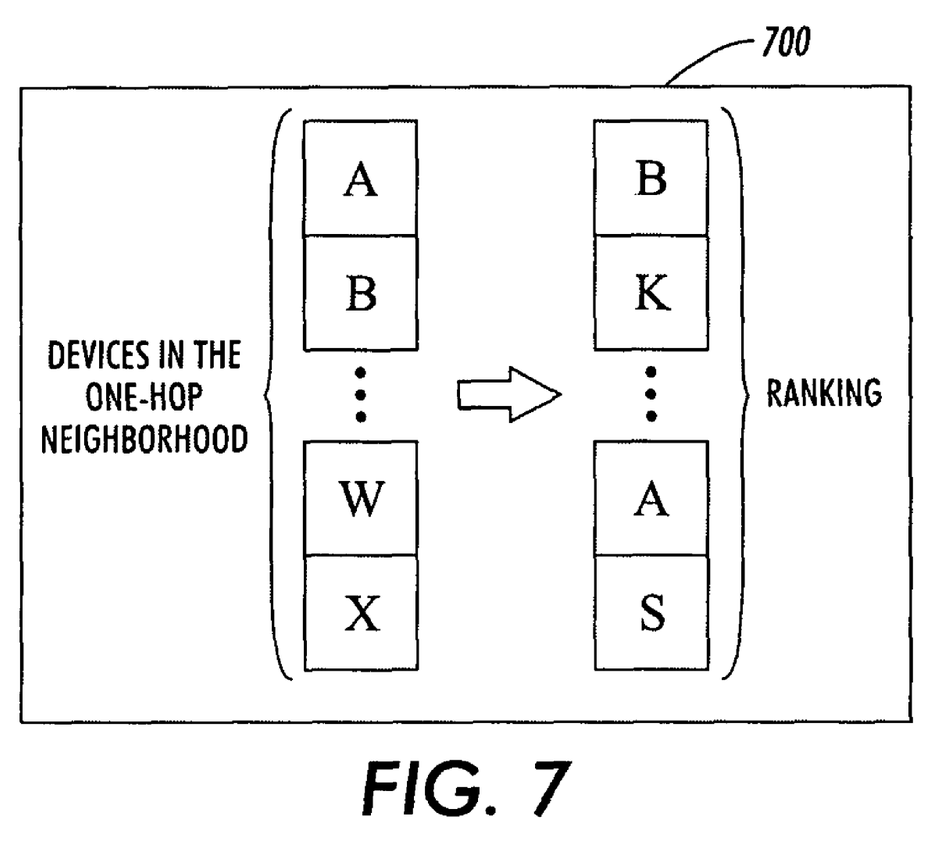
FIG. 7 is a block diagram illustrating a ranking of devices in accordance with an embodiment of the present invention.

FIG. 7 is a block diagram illustrating a ranking 700 of devices in accordance with an embodiment of the present invention. By applying a hash function one or more times to a list of devices in the one-hop neighborhood 710, a ranking 712 for a sub-channel may be determined. In this example, device B has priority for this sub-channel. In other embodiments, the ranking 712 is determined using different operations. For example, the ranking 712 may be determined based on one or more pseudo-random sequences.

As an illustration, suppose a device M determines that there is a conflict for a sub-channel in its two-hop neighborhood. The device M may then search a first ranking for this sub-channel for the device in its one-hop neighborhood that has the highest priority. If device N has the highest priority, it is the only device that could win the election for this sub-channel. Therefore, device N should be the source of the conflict and device M needs to notify device N about the conflict occurrence so device N can resign. Note that this channel-access protocol handles conflicts at an arbitrary time, i.e., conflicts that occur in the random-access interval and/or the scheduled-access interval.

To alert device N of the conflict, device M may compare its priority to a second ranking for this sub-channel based on the devices in the one-hop neighborhood of device N. If the priority of device M is the nth highest, device M may send an RRC to device N using the nth mini-slot (out of K mini-slots) in the sub-channel. When device N receives the RRC, it realizes that its reservation request has caused conflicts, so it gives up the request and remains silent during the remainder of the sub-channel. Furthermore, since the remaining devices in the one-hop neighborhood of device N do not receive data packets from device N during the sub-channel, they realize that device N has canceled its reservation request. Thus, in this embodiment these other devices do not further propagate this information.

For example, suppose we have a chain of five devices. Devices 2 and 4 in this chain are aware that they share a one-hop neighbor, device 3, which has reserved the current sub-channel, a time slot in a frame. Thus, devices 2 and 4 remain silent and wait for the RTR that will be sent by device 3. Now suppose that device 2 successfully receives the RTR but device 4 does not. In this case, device 4 starts to compare the priority of its one-hop neighbors, devices 3 and 5. It finds that device 5 has the higher priority, so device 4 infers that device 5 has caused the conflict. Device 4 then compares its priority in the ranking of the one-hop neighbors of device 5 for this time slot. If it has a lower priority than device 5, device 4 sends an RRC in the $2^{nd}$ mini-slot. Otherwise, it sends the RRC in the $1^{st}$ mini-slot.

In addition to resolving such conflicts, the devices in an ad-hoc network may also propagate information about changes in the network topography. For example, when a device S receives an RTR from a previously unheard device U, device S immediately infers that its neighborhood information is outdated. To rapidly exchange topology information with its neighbors, device S randomly selects one of the K RRC mini-slots in a sub-channel and broadcast its own identity as well as its one-hop neighbor list. Upon receiving such information, device U updates its own two-hop neighborhood information, prepares a data packet containing the updated information, and transmits it in another data mini-slot.

Similarly, when a device S no longer receives an RTR in a time slot that is reserved by device U in its one-hop neighborhood, device S immediately infers that device U is no longer in its one-hop neighborhood. Thus, device S removes device U from its neighborhood list and uses a priority RRC (as described in the previous paragraph) to announce this event. In particular, device S determines it priority for the next time slot (or sub-channel) among all the devices in its one-hop neighborhood. If device S is at position r in the ranking then device S may broadcast a message in the $r^{th}$ RRC mini-slot to announce the removal of device U from its one-hop neighbor list. When this announcement is received by the neighbors of device S, they may update their neighborhood information accordingly.

We now illustrate how to apply these two mechanisms to handle the common topological changes of device addition, device deletion, and device movement. In device addition, suppose that device 1 has four neighbors, devices 2-5, and that it turns on its radio in time slot t. During a time period T, device 1 remains in a receive mode of operation. Since each of the devices 2-5 should reserve at least one time slot during the time period T, device 1 will have multiple opportunities to have a RTR-RRC dialog with each of its neighbors. Using fast propagation of this new-neighbor information, after four dialogs, device 1 acquires a complete two-hop neighborhood list and devices 2-5 are aware of the addition of device 1.

In device deletion, suppose device 1 has four neighbors, devices 2-5, and that it turns off its radio in time slot t. Note that device 1 should have previously reserved at least one time slot in a frame. In the first of these time slots, devices 2-5 do not receive a RTR from device 1. Using fast propagation of the disappearing-neighbor information, these four devices will use the prioritized RRC technique to separately transmit in four RRC mini-slots thereby notifying their neighbors that device 1 has disappeared.

Finally, from the perspective of network topology, device movement may be treated as a concurrent occurrence of a device addition and a device deletion. Thus, it may be handled by using the two fast-propagating-information mechanisms simultaneously.

Note that after devices update their two-hop neighborhood information due to additions, deletions, and/or movement, they may correct any reservations that are in conflict. In particular, if any time slots reserved by a given device are in conflict with the reservations made by other devices, the given device may adjust its reservations by releasing certain reserved time slots and/or requesting to reserve new ones.

In some embodiments, the procedure for releasing a reserved time slot is different than that for requesting a new reservation. In particular, the given device may send a release message in an RTR mini-slot. Such a message specifies the time slot to be released as well as the device identity. This message may be delivered to all of the two-hop neighbors so they may update their reservation tables or lists.

Also note that the proposed fast-propagating-information mechanisms may work best for moderate topological changes, i.e., those in which no more than one device at a time changes its activity state or location within a local two-hop neighborhood. For such moderate topological changes, most schedules remain valid and may be exploited by the few state-changing devices to update the neighborhood information. However, when the topology changes significantly, the periodic random-access section may be used to address it.

Figure 8:
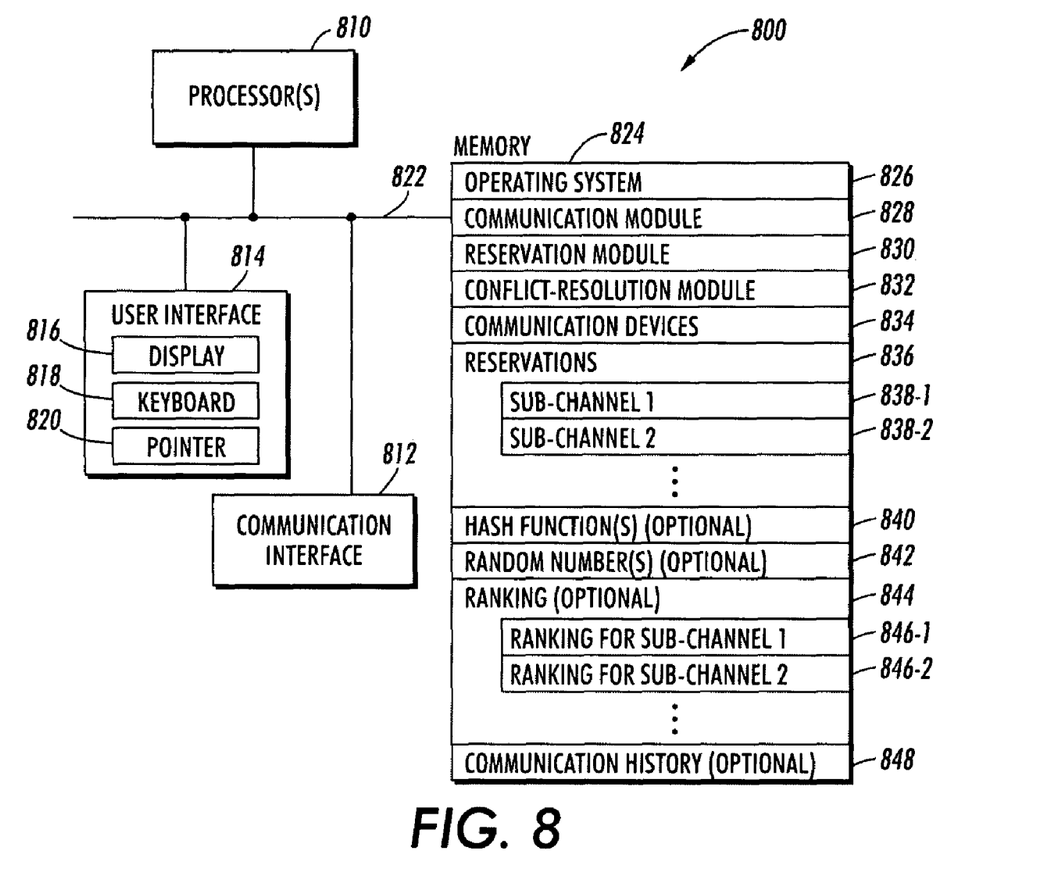
FIG. 8 is a block diagram illustrating a device in accordance with an embodiment of the present invention.

We now described devices for using in ad-hoc networks. FIG. 8 is a block diagram illustrating a device 800 in accordance with an embodiment of the present invention. Device 800 includes one or more processors 810, a communication interface 812, a user interface 814, and one or more signal lines 822 coupling these components together. Note that the one or more processing units 810 may support parallel processing and/or multi-threaded operation, the communication interface 812 may have a persistent communication connection, and the one or more signal lines 822 may constitute a communication bus. Moreover, the user interface 814 may include a display 816, a keyboard 818, and/or a pointer 820, such as a mouse.

Memory 824 in the device 800 may include volatile memory and/or non-volatile memory. More specifically, memory 824 may include ROM, RAM, EPROM, EEPROM, FLASH, one or more smart cards, one or more magnetic disc storage devices, and/or one or more optical storage devices. Memory 824 may store an operating system 826 that includes procedures (or a set of instructions) for handling various basic system services for performing hardware dependent tasks. In some embodiments, the operating system 826 is a real-time operating system. The memory 824 may also store procedures (or a set of instructions) in a communication module 828. The communication procedures may be used for communicating with one or more computers, devices and/or servers, including computers, devices and/or servers that are remotely located with respect to the device 800.

Memory 824 may also include multiple program modules (or a set of instructions), including reservation module 830 (or a set of instructions) and conflict-resolution module 832 (or a set of instructions). Furthermore, memory 824 may include a list of communication devices 834 in the two-hop neighborhood of the device 800, reservations 836 for sub-channels 838, and/or one or more optional rankings 844 (including rankings for different sub-channels 846). The one or more rankings 844 may be determined using one or more optional hash functions 840 and/or one or more optional pseudo-random sequences 842. In addition, memory 824 may include an optional communication history 848, which may store times when information is received by one or more of the communication devices 834.

Instructions in the various modules in memory 824 may be implemented in a high-level procedural language, an object-oriented programming language, and/or in an assembly or machine language. The programming language may be compiled or interpreted, i.e, configurable or configured to be executed by the one or more processing units 810.

Although device 800 is illustrated as having a number of discrete items, FIG. 8 is intended to be a functional description of the various features that may be present in device 800 rather than as a structural schematic of the embodiments described herein. In practice, and as recognized by those of ordinary skill in the art, the functions of the device 800 may be distributed over a large number of servers or computers, with various groups of the servers or computers performing particular subsets of the functions. In some embodiments, some or all of the functionality of device 800 may be implemented in one or more ASICs and/or one or more digital signal processors DSPs.

Device 800 may include fewer components or additional components, two or more components may be combined into a single component, and/or a position of one or more components may be changed. In some embodiments the functionality of device 800 may be implemented more in hardware and less in software, or less in hardware and more in software, as is known in the art.

Figure 9:
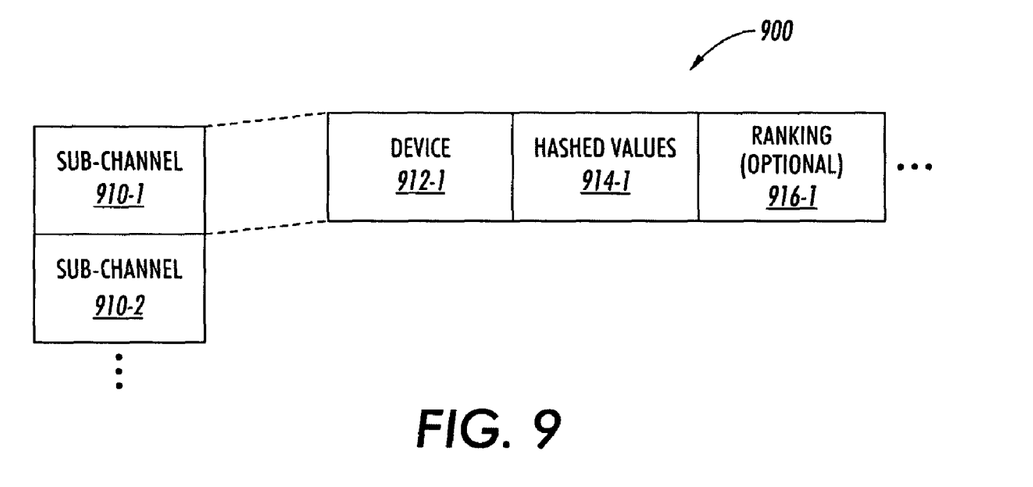
FIG. 9 is a block diagram illustrating a data structure in accordance with an embodiment of the present invention.

We now discuss data structures that may be used in device 800. FIG. 9 is a block diagram illustrating a data structure 900 in accordance with an embodiment of the present invention. This data structure may include reservations for sub-channels 910. Each of these reservations may include a device 912 that made the reservation, one or more hashed values 914, and/or an optional ranking 916. Note that that in some embodiments of the data structure 900 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A device comprising:
   a processor;
   a memory;
   a frame-receiving mechanism configured to receive a temporal sequence of frames, which is transmitted on a randomized schedule and includes a sub-channel and neighborhood network information associated with a first device and a second device;
   a reservation-receiving mechanism configured to receive two conflicting reservations from the first device and the second device respectively for the sub-channel in a next frame;
   a priority-determining mechanism configured to determine a priority associated with each of the first and second devices based on values associated with the first and second devices and values associated with devices that the first and second devices are known to communicate with according to the neighborhood network information;
   a conflict-resolving mechanism configured to determine a winning device to resolve the conflicting reservations between the first and second devices by comparing the priority associated with each of the first and second devices; and
   a transformation mechanism configured to incrementally transform the randomized schedule into a deterministic schedule, which involves providing feedback to devices that the first and second devices are known to communicate with, wherein the feedback indicates that transmission through the sub-channel for subsequent frames are reserved for the winning device, wherein access delay associated with the sub-channel is bounded during transmission.

2. The device of claim 1, wherein the network information is included in a first portion of the next frame and the sub-channel is included in a second portion of the next frame.

3. The device of claim 1, wherein the network information further specifies a time when the first device received a frame from the second device.

4. The device of claim 1, wherein the sub-channel corresponds to a time slot in the next frame.

5. The device of claim 1, wherein the sub-channel corresponds to a frequency band.

6. The device of claim 1, wherein the sub-channel corresponds to a spread-spectrum code.

7. The device of claim 1, wherein the sub-channel corresponds to a directional antenna which transmits and receives the next frame.

8. The device of claim 1, wherein the sub-channel is reserved for one next frame.

9. The device of claim 1, wherein the sub-channel is reserved for two or more next frames.

10. The device of claim 1, wherein the sub-channel is dynamically reserved based on usage probabilities that are determined from network information in multiple frames.

11. The device of claim 1, wherein communication between the devices is synchronized based on a clock signal.

12. The device of claim 11, wherein the clock signal includes a global positioning system signal.

13. The device of claim 1, wherein communication between the devices is self-synchronized.

14. The device of claim 1, wherein the frame has a duration of at least 0.5 ms.

15. A communication device, comprising:
a transceiver mechanism configured to receive a temporal sequence of frames, which is transmitted on a randomized schedule and includes a sub-channel and neighborhood network information associated with the communication device and a second device, wherein the network information in a given frame transmitted by the communication device includes identification information for a second device that is communicating with the communication device and a corresponding sub-channel used by the communication device and the second device to transmit data; and
a sending mechanism configured to send a reservation from the communication device for a sub-channel in a next frame to a third device,
  wherein the third device also receives two conflicting reservations from the communication device and from the second device respectively for the sub-channel in the next frame,
  wherein the third device determines a priority associated with each of the first and second devices based on values associated with the first and second devices and values associated with devices that the first and second devices are known to communicate with according to the neighborhood network information;
  wherein the third device determines a winning device to resolve the conflicting reservations between the communication device and the second device by comparing the priority associated with each of the first and second devices, and
  wherein the third device incrementally transforms the randomized schedule into a deterministic schedule, which involves providing feedback to devices that the communication device and second device are known to communicate with, wherein the feedback indicates that transmission through the sub-channel for subsequent frames are reserved for the winning device, wherein access delay associated with the sub-channel is bounded during transformation.

16. A method for communicating between two devices, comprising:
receiving a temporal sequence of frames, which is transmitted on a randomized schedule and includes a sub-channel and neighborhood network information associated with a first device and a second device;
receiving two conflicting reservations from the first device and the second device respectively for the sub-channel in a next frame;
determining a priority associated with each of the first and second devices based on values associated with the first and second devices and values associated with devices that the first and second devices are known to communicate with according to the neighborhood network information;
determining a winning device to resolve the conflicting reservations between the first and second devices by comparing the priority associated with each of the first and second devices; and
incrementally transforming the randomized schedule into a deterministic schedule, which involves providing feedback to devices that the first and second devices are known to communicate with, wherein the feedback indicates that transmission through the sub-channel for subsequent frames are reserved for winning device, wherein access delay associated with the sub-channel is bounded during transformation.

* * * * *

UNITED STATES PATENT AND TRADEMARK OFFICE
CERTIFICATE OF CORRECTION

| | |
|---|---|
| PATENT NO. | : 7,937,060 B2 |
| APPLICATION NO. | : 11/544059 |
| DATED | : May 3, 2011 |
| INVENTOR(S) | : Xiaoqiao Meng et al. |

It is certified that error appears in the above-identified patent and that said Letters Patent is hereby corrected as shown below:

On the title page, in (73) Assignee section, please delete the second "Alto" in the assignee's name, so that it reads: Palo Alto Research Center Incorporated.

Signed and Sealed this
Tenth Day of January, 2012

David J. Kappos
*Director of the United States Patent and Trademark Office*